United States Patent
Suefuji et al.

(10) Patent No.: US 9,154,056 B2
(45) Date of Patent: Oct. 6, 2015

(54) ROTARY TYPE VIBRATION WAVE DRIVING APPARATUS

(75) Inventors: Kei Suefuji, Tokyo (JP); Atsushi Kimura, Funabashi (JP); Takao Mori, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 391 days.

(21) Appl. No.: 13/143,768

(22) PCT Filed: Mar. 18, 2010

(86) PCT No.: PCT/JP2010/055301
§ 371 (c)(1),
(2), (4) Date: Jul. 8, 2011

(87) PCT Pub. No.: WO2010/116896
PCT Pub. Date: Oct. 14, 2010

(65) Prior Publication Data
US 2011/0273058 A1    Nov. 10, 2011

(30) Foreign Application Priority Data

Apr. 7, 2009  (JP) ................ 2009-092671
Feb. 4, 2010  (JP) ................ 2010-023124

(51) Int. Cl.
*H02N 2/12* (2006.01)
*H02N 2/16* (2006.01)
(Continued)

(52) U.S. Cl.
CPC ........... *H02N 2/163* (2013.01); *H02N 2/103* (2013.01); *H02N 2/026* (2013.01)

(58) Field of Classification Search
CPC ........ H02N 2/103; H02N 2/026; H02N 2/163
USPC ...................... 310/323.02, 323.09
See application file for complete search history.

(56) References Cited

U.S. PATENT DOCUMENTS 4,692,650 A    9/1987  Okumura et al.
5,028,833 A *  7/1991  Kawai ............... 310/323.08
(Continued)

FOREIGN PATENT DOCUMENTS

CN    1870413 A    11/2006
JP    61-22778 A    1/1986
(Continued)

OTHER PUBLICATIONS

Notification of Transmittal of the International Search Report and the Written Opinion of the International Searching Authority dated Jun. 15, 2010, International Search Report, and Written Opinion in related corresponding PCT International Application No. PCT/JP2010/055301.

(Continued)

*Primary Examiner* — Derek Rosenau
*Assistant Examiner* — Bryan Gordon
(74) *Attorney, Agent, or Firm* — Fitzpatrick, Cella, Harper & Scinto

(57) ABSTRACT

A rotary type vibration wave driving apparatus which is capable of reducing local wear of a contacting member and of reducing performance deterioration due to long term operation is provided. The apparatus includes a electro-mechanical energy conversion element, an vibration member fixed to the electro-mechanical energy conversion element and vibrated by a voltage being supplied to the electro-mechanical energy conversion element, and a moving member being brought into contact with the vibration member and frictionally driven by the vibration, and is configured such that the moving member includes a supporting portion extended from the main body portion of the moving member, and a contacting portion extended from the supporting portion and being brought into contact with the vibration member, and such that each of the supporting portion and the contacting portion is configured to be elastically deformable in the rotation axis direction of the moving member.

22 Claims, 7 Drawing Sheets

(51) Int. Cl.
*H02N 2/10* (2006.01)
*H02N 2/02* (2006.01)

(56) References Cited

U.S. PATENT DOCUMENTS

| | | | |
|---|---|---|---|
| 5,578,887 A | | 11/1996 | Shirasaki |
| 5,646,469 A | | 7/1997 | Tsukimoto et al. |
| 6,150,749 A | * | 11/2000 | Tamai et al. ............ 310/323.12 |
| 6,198,202 B1 | | 3/2001 | Tamai et al. |
| 7,439,653 B2 | * | 10/2008 | Fujimoto ................. 310/323.09 |
| 7,508,114 B2 | * | 3/2009 | Kasai et al. ............. 310/323.16 |
| 2001/0000940 A1 | * | 5/2001 | Maruyama et al. ........... 310/326 |
| 2006/0220496 A1 | | 10/2006 | Fujimoto |
| 2009/0237818 A1 | * | 9/2009 | Sato .............................. 359/824 |
| 2010/0000940 A1 | * | 1/2010 | Menke et al. ................. 210/601 |

FOREIGN PATENT DOCUMENTS

| | | |
|---|---|---|
| JP | 61-224882 A | 10/1986 |
| JP | 63-174581 A | 7/1988 |
| JP | 03-074183 A | 3/1991 |
| JP | 05-184168 A | 7/1993 |
| JP | 06-153548 A | 5/1994 |
| JP | 08-098566 A | 4/1996 |
| JP | 3202499 B2 | 8/2001 |
| JP | 2002-315364 A | 10/2002 |
| JP | 2006-311790 A | 11/2006 |

OTHER PUBLICATIONS

Feb. 25, 2014 Japanese Office Action in Japanese Patent Application No. 2010-023124.

Chinese Office Action dated Sep. 29, 2013, in related Chinese Patent Application No. 201080014784.3 (with English translation).

Jun. 9, 2014 Chinese Office Action in Chinese Patent Application No. 201080014784.3.

Nov. 3, 2014 European Search Report in European Patent Application No. 10761596.5.

* cited by examiner

ROTARY TYPE VIBRATION WAVE DRIVING APPARATUS

TECHNICAL FIELD

The present invention relates to a rotary type vibration wave driving apparatus.

BACKGROUND ART

Generally, a vibration driven apparatus applied to a vibration wave motor has an vibration member in which vibration waves are formed, and a moving member which is brought into pressure contact with the vibration member, and obtains driving force by making the vibration member and the moving member frictionally driven by the vibration waves.

Therefore, a contacting portion arranged between the vibration member and the moving member extracts the driving force by repeating contact and separation with and from the vibration member while being deformed so as to follow the vibration of the vibration member.

A prior art form of a vibration wave motor of this kind is illustrated in FIG. 9A. (see Japanese Patent Application Laid-Open No. S61-224882). In FIG. 9A, a vibration member 122 is formed into an annular shape, and a plurality of protrusions 122b are formed in the upper portion of the vibration member 122 over the whole circumference of the vibration member 122.

A moving member 123 is brought into pressure contact with the vibration member 122 by a pressing member (not illustrated). The moving member 123 is configured by a ring-shaped main body portion 123a which is formed by an elastic member, a flange portion 123b which is extended from the main body portion 123a, and a contacting portion 123c which is extended from an end portion of the flange portion 123b and which has a friction surface that is brought into contact with the vibration member 122.

A piezoelectric ceramic 121 is bonded with an adhesive to the bottom surface of the vibration member 122, and generates traveling waves at the time when alternating voltages having a phase difference therebetween are applied to the piezoelectric ceramic 121 from a driving circuit (not illustrated) for driving the motor. When the traveling direction of the traveling waves is the positive direction of the θ direction (see the arrow in FIG. 9A), the moving direction of the frictionally driven moving member 123 becomes the negative direction of the θ direction.

In such a case of the moving member 123 configured to have the flange portion, the direction of trajectory of vibration generated in the vibration member 122 substantially coincides with the direction of displacement of the contacting portion of the moving member 123 when viewed on the plane formed by the radial direction and the vertical direction in the cylindrical coordinate system centering on the rotation axis of the moving member. When the direction of vibration trajectory substantially coincides with the direction of displacement, the sliding in the radial direction on the friction surface can be reduced to prevent deterioration of efficiency.

Further, a configuration of a moving member of a vibration wave motor in another prior art form is illustrated in FIG. 9C (see Japanese Patent Application Laid-Open No. 2002-315364).

In FIG. 9C, a plurality of contacting portions 133c which are brought into contact with the vibration member and which have predetermined spring stiffness are concentrically provided at a moving member 133.

Since the plurality of contacting portions 133c are provided, the contact area is increased, and the surface pressure of the contacting portions is reduced. Thereby, the wear of the contacting portions 133c is reduced to improve the durability of the vibration wave motor.

However, the contacting portion of the vibration wave motor of the prior art form illustrated in FIG. 9A as described above is configured to have a cantilever section having a predetermined contact width.

The contacting portion 123c of the moving member 123 is brought into contact with the vibration member 122, as illustrated in FIG. 9B.

In this case, only the vicinity of the outer diameter side edge portion of the friction surface of the contacting portion 123c is brought into contact by strong pressure with the vibration member 122, and hence the whole friction surface is not brought into uniform contact with the vibration member 122.

Therefore, even when the contact area of the contacting portion 123c is increased by simply enlarging the contacting portion 123c so as to reduce the surface pressure applied to the friction surface, for the purpose of improving the durability of the vibration wave motor, the contact area is not increased and the surface pressure is not reduced because the friction surface is brought into contact with the vibration member 122 only in the vicinity of the outer diameter side edge portion of the friction surface.

Further, when the width of the contacting portion 123c is increased, even in the case where the wear in the vicinity of the outer diameter side edge portion of the contacting portion 123c progresses and the whole friction surface of the contacting portion 123c is brought into contact with the vibration member 122, the portion of the friction surface, in which portion the direction of vibration trajectory of the vibration member 122 does not coincide with the direction of displacement of the contacting portion 123c, is increased.

This causes reduction of efficiency and generation of squealing sounds, and also causes wear. Thus, it is necessary to reduce, as a whole, the pressure force applied to the vibration member so that the friction is stabilized even at the outer diameter side edge portion of the contacting portion 123c at which the edge portion is brought into contact with the vibration member by strong pressure.

The output torque may be considered to be substantially proportional to the applied pressure force. Thus, when the applied pressure force is reduced, the output torque of the vibration wave motor is also restricted.

On the other hand, in the contacting portion 133c of the vibration wave motor of the prior art form illustrated in FIG. 9C as described above, the plurality of contacting portions are provided, and hence the contact area can be increased to improve the durability of the vibration wave motor.

Further, the direction of displacement of the respective contacting portions can be made coincident with the direction of vibration trajectory of the vibration member, so that the sliding in the radial direction on the friction surface can be reduced.

However, each of the contacting portions 133c has a cantilever section similarly to the vibration wave motor of the prior art form illustrated in FIG. 9A as described above. Thus, the local wear may be caused in dependence upon the contact state between the vibration member and the contacting portion 133c as illustrated in FIG. 9B, so as to deteriorate the performance of the vibration wave motor.

As described above, in the configuration of the contacting portion of the conventional vibration wave motor, there is a problem that the durability of the vibration wave motor is deteriorated by the local wear of the contacting portion.

DISCLOSURE OF THE INVENTION

In view of the above described problem, it is an object of the present invention to provide a rotary type vibration wave driving apparatus which is capable of reducing local wear of a contacting member and of reducing deterioration of performance due to long term operation.

The present invention is to provide a rotary type vibration wave driving apparatus configured as will be described below.

According to the present invention, it is possible to realize a rotary type vibration wave driving apparatus which is capable of reducing local wear of the contacting member and of reducing deterioration of the performance due to long time operation.

Further features of the present invention will become apparent from the following description of exemplary embodiments with reference to the attached drawings.

BEST MODES FOR CARRYING OUT THE INVENTION

In the following, embodiments according to the present invention will be described.

First Embodiment

Figure 1:
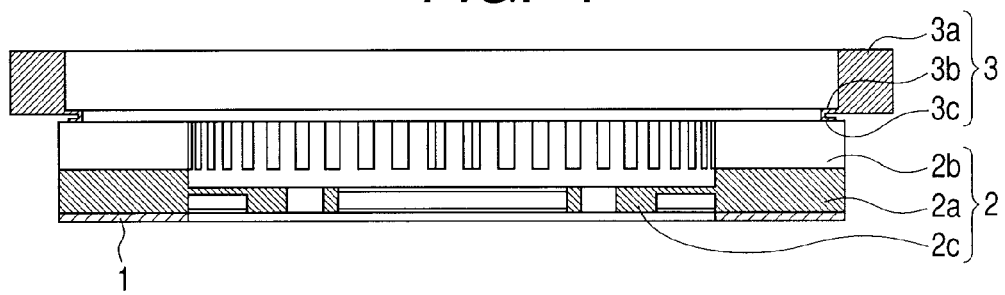
FIG. 1 is a sectional view for describing a configuration of a vibration driven apparatus according to a first embodiment of the present invention.

A rotary type vibration wave driving apparatus according to a present embodiment illustrated in FIG. 1 is formed in an annular shape, and includes a piezoelectric element 1, an vibration member 2, and a moving member 3.

The piezoelectric element 1 is a electro-mechanical energy conversion element which converts an electrical amount into a mechanical amount, and is coupled to the vibration member 2.

The vibration member 2 is a metallic elastic member, and is configured by a base 2a, protrusions 2b, and a flange portion 2c that is extended from the base 2a and is used to fix the vibration member 2.

The protrusions 2b are arranged concentrically around the central axis of the vibration member 2 along the outer diameter side of the base 2a. The surface of the protrusions 2b on the side of the moving member 3 is the surface which is brought into contact with the moving member 3.

The moving member 3 is configured by an annular main body portion 3a formed by an elastic member, a supporting portion 3b, and a contacting portion 3c which has a friction surface that is brought into contact with the protrusions 2b of the vibration member 2.

The moving member 3 is configured so as to be brought into pressure contact with the vibration member 2 by pressing force applied by a pressing unit (not illustrated), and is frictionally driven by the friction with the vibration member 2.

In the vibration driven apparatus, the driving force from the moving member 3 is transmitted to an apparatus outside the vibration driven apparatus via an output shaft or the like, so as to drive the outside apparatus.

Figure 2:
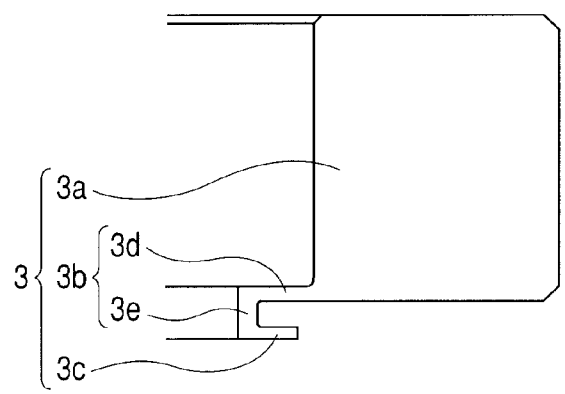
FIG. 2 is a partially enlarged sectional view of the moving member illustrated in FIG. 1 of the first embodiment according to the present invention.

In FIG. 2 illustrating a partially enlarged cross section of FIG. 1, the supporting portion 3b is configured by a first supporting portion 3d and a second supporting portion 3e.

The first supporting portion 3d is extended from the main body portion 3a in parallel with the contact surface of the vibration member 2. The second supporting portion 3e is extended vertically from the end portion of the first supporting portion 3d. The contacting portion 3c is extended from the end portion of the second supporting portion 3e in parallel with the contact surface of the vibration member 2.

Each of the supporting portion 3b and the contacting portion 3c is formed in a thickness to have a spring property, and has a cantilever sectional structure.

Thereby, each of the supporting portion 3b and the contacting portion 3c is made elastically deformable in the rotation axis direction of the moving member 3. Further, each of the supporting portion 3b and the contacting portion 3c is also made elastically deformable in the radial direction of the moving member 3. The supporting portion 3b is extended from the main body portion 3a to the inner diameter side, and the contacting portion 3c is extended from the end portion of the supporting portion 3b to the outer diameter side.

Further, the supporting portion 3b and the contacting portion 3c are formed to have a uniform thickness in the circumferential direction so that displacement of the friction surface of the contacting portion 3c in the rotation axis direction and the radial direction is uniform in the circumferential direction. In the present invention, the radial direction indicates the direction perpendicular to the rotation axis direction.

Figure 3:
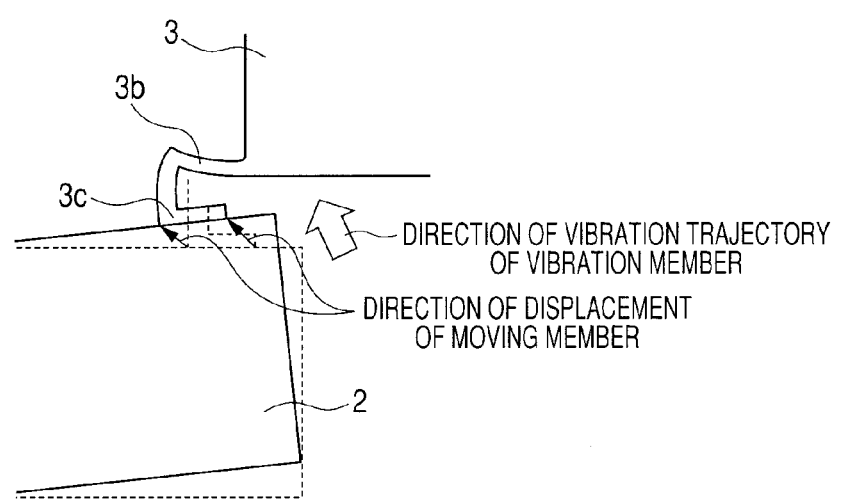
FIG. 3 is a view illustrating a state where the vibration member and the moving member, which are illustrated in FIG. 1 according to the first embodiment of the present invention, are brought into contact with each other.

In FIG. 3 illustrating a state in which the vibration member and the moving member are brought into contact with each other, a driving voltage is applied to the piezoelectric element 1 (not illustrated in FIG. 3) joined to the vibration member 2, so that traveling waves are generated by a conventional technique in a vibration member configured by the vibration member 2 and the piezoelectric element 1. The amplitude of the vibration generated in the vibration member 2 is set to be larger on the outer diameter side than on the inner diameter side.

The upper surface of the protrusions 2b of the vibration member 2 vibrates in the direction illustrated by the arrow in the figure, so as to drive the moving member 3 via the contacting portion 3c.

Each of the supporting portion 3b and the contacting portion 3c of the moving member 3 is made elastically deformable, and the displacement of the contacting portion 3c is set to be larger on the outer diameter side than on the inner diameter side. Thereby, the contact surface of the vibration member 2 and the friction surface of the contacting portion 3c are repeatedly brought into contact with each other, while the inclination of the contact surface of the vibration member 2 and the inclination of the friction surface of the contacting portion 3c are maintained in parallel with each other.

As a result, the whole friction surface of the contacting portion 3c can be brought into contact with the vibration member 2.

Thereby, the contact surface pressure on the friction surface of the contacting portion 3c can be made uniform, so that it is possible to reduce the local wear which is a problem in the conventional structure.

Further, when the contacting portion of the moving member is enlarged in the conventional structure, the portion of the friction surface, in which portion the direction of vibration trajectory of the vibration member does not coincide with the direction of displacement of the contacting portion, is increased, so that the sliding in the radial direction is increased, which causes a performance deterioration.

On the other hand, in the present embodiment, as illustrated in FIG. 3, the direction of displacement of the friction surface of the contacting portion 3c of the moving member 3 substantially coincides with the direction of vibration trajectory of the vibration member 2 over the whole region of the friction surface.

Thus, when the contact area is increased by enlarging the contacting portion 3c, it is possible to improve the durability of the vibration driven apparatus, while avoiding the deteriorations of performance, such as the reduction in efficiency, and the generation of squealing sounds.

Here, the effect of the present embodiment, in which each of the supporting portion 3b and the contacting portion 3c of the moving member 3 is formed to be elastically deformable, is described.

Figure 4A:
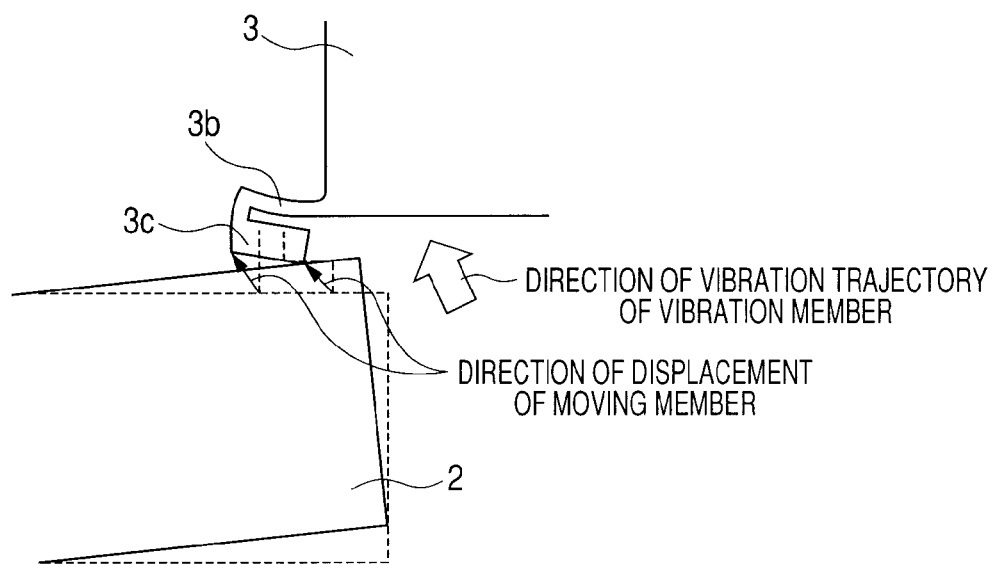
FIG. 4A and FIG. 4B are views illustrating comparison examples for respectively describing the cases where only one of the supporting portion and the contacting portion of the moving member can be elastically deformed.
Figure 4B:
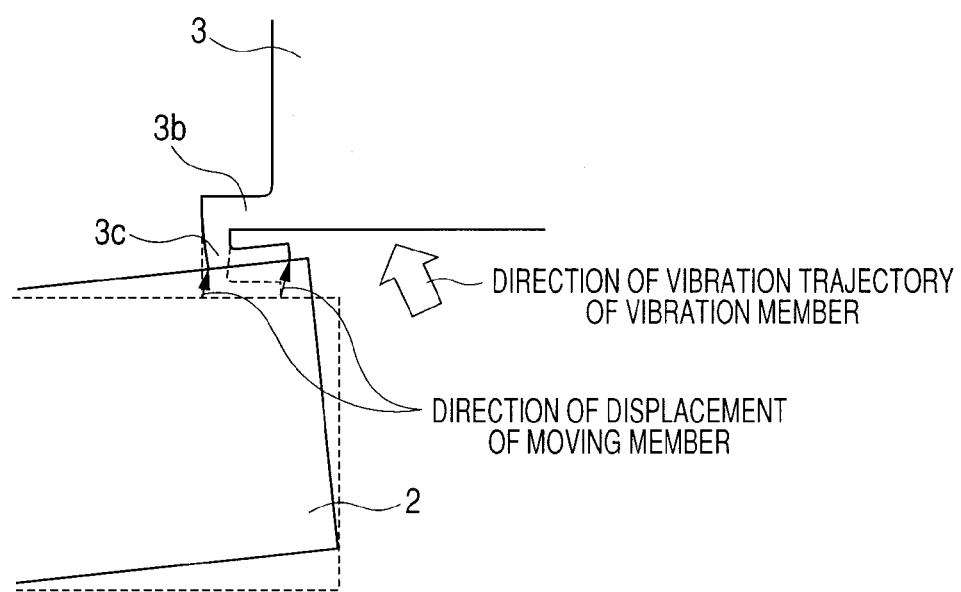

As examples to be compared with the present embodiment, the cases where only one of the supporting portion and the contacting portion of the moving member is elastically deformable are illustrated in FIG. 4A and FIG. 4B, respectively.

As illustrated in FIG. 4A, in the case where the supporting portion 3b is elastically deformed, and where the contacting portion 3c is not elastically deformed, the inclination of the contact surface of the vibration member 2 does not coincide with the inclination of the friction surface of the contacting portion 3c similarly to the case of the conventional structure. Therefore, only the vicinity of the outer diameter side edge portion of the friction surface of the contacting portion 3c is brought into contact by strong force with the vibration member 2, and the whole friction surface of the contacting portion 3c is not brought into uniform contact with the vibration member 2.

This causes local wear in the vicinity of the outer diameter side edge portion which is brought into contact with the vibration member by strong force. Thereby, the performance of the vibration driven apparatus may be deteriorated.

On the contrary, as illustrated in FIG. 4B, in the case where the contacting portion 3c is elastically deformed, and where the supporting portion 3b is not elastically deformed, the inclination of the contact surface of the vibration member 2 becomes substantially in parallel with the inclination of the friction surface of the contacting portion 3c, so that the whole friction surface of the contacting portion 3c can be brought into contact with the vibration member 2.

However, the direction of displacement of the friction surface of the contacting portion 3c does not coincide with the direction of vibration trajectory of the vibration member 2, so that the slipping is generated in the radial direction.

This causes the deteriorations of performance, such as the generation of squealing sounds, the reduction in torque, and the reduction in efficiency.

In the present embodiment, since each of the supporting portion 3b and the contacting portion 3c can be elastically deformed, the friction surface of the contacting portion 3c is deformed in such a manner that the deformation of the supporting portion 3b and the deformation of the contacting portion 3c, which are respectively illustrated in FIG. 4A and FIG. 4B, are combined with each other.

That is, the inclination of the friction surface of the contacting portion 3c, which inclination is formed by the deformation of the supporting portion 3b, can be changed by the deformation of the contacting portion 3c, so as to become substantially in parallel with the inclination of the contact surface of the vibration member 2.

Further, the direction of vibration trajectory of the vibration member 2 can be made substantially coincident with the direction of displacement of the friction surface of the contacting portion 3c of the moving member 3 over the whole region of the friction surface.

Thereby, the whole friction surface of the contacting portion 3c can be brought into contact with the vibration member 2. As a result, the local wear of the contacting portion 3c can be reduced, and the deterioration of performance due to long term operation can be reduced.

Note that in the present embodiment, the supporting portion 3b, which is configured by the first supporting portion 3d and the second supporting portion 3e, is configured such the first supporting portion 3d is extended from the main body portion 3a in parallel with the contact surface of the vibration member 2, and such that the second supporting portion 3e is vertically extended from the first supporting portion 3d.

However, the present invention is not limited to these configurations.

Figure 5A:
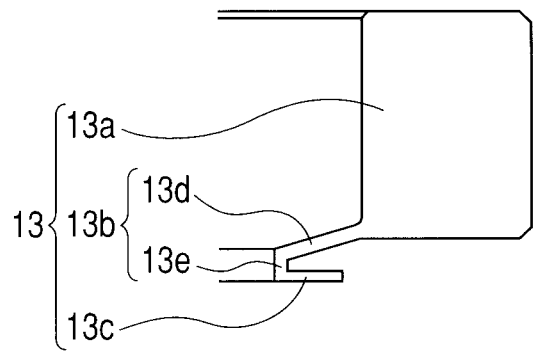
FIG. 5A is a partially enlarged sectional view of a moving member according to a first modification of the vibration driven apparatus according to the first embodiment.

For example, as illustrated in FIG. 5A, a first supporting portion 13d may be obliquely extended toward the inner diameter side from a main body portion 13a.

Figure 5B:
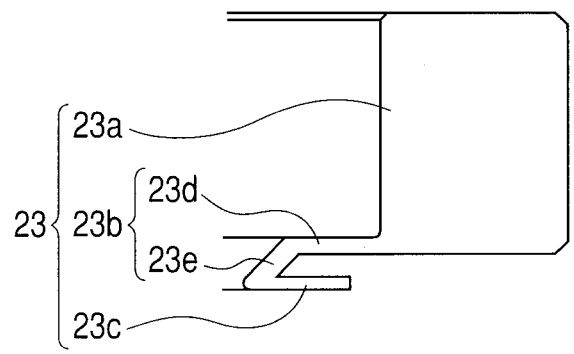
FIG. 5B is a partially enlarged sectional view of a moving member according to a second modification of the vibration driven apparatus according to the first embodiment.
Figure 5C:
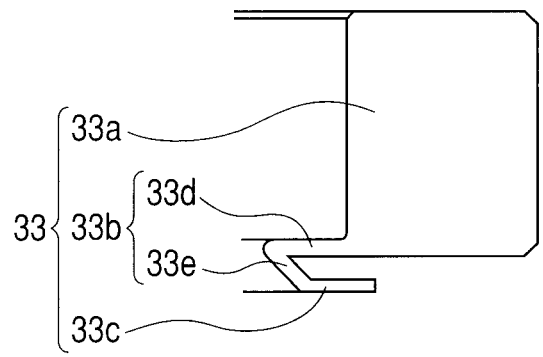
FIG. 5C is a partially enlarged sectional view of a moving member according to a third modification of the vibration driven apparatus according to the first embodiment.

Further, as illustrated in FIG. 5B, a second supporting portion 23e may be obliquely extended toward the inner diameter side from a first supporting portion 23d. Further, on the contrary, as illustrated in FIG. 5C, a second supporting portion 33e may be obliquely extended toward the outer diameter side from a first supporting portion 33d.

Figure 5D:
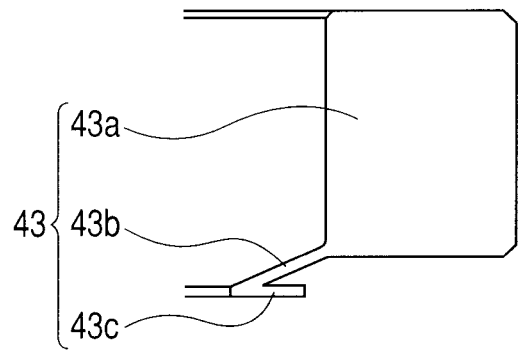
FIG. 5D is a partially enlarged sectional view of a moving member according to a fourth modification of the vibration driven apparatus according to the first embodiment.

Further, as illustrated in FIG. 5D, a supporting portion 43b may be configured by one supporting portion in such a manner that the supporting portion 43b is obliquely extended toward the inner diameter side from the main body portion, and that a contacting portion 43c is extended from the supporting portion 43b.

When the supporting portion is inclined as illustrated in FIG. 5A, FIG. 5B, FIG. 5C and FIG. 5D, the weight of the supporting portion can be reduced. Thereby, the natural frequency of the supporting portion and the contacting portion of the moving member is raised, so that the follow-up performance with respect to the vibration of the vibration member can be improved.

Note that in FIG. 5A, FIG. 5B, FIG. 5C and FIG. 5D, reference characters 13a, 13b, 13c, 13d and 13e, reference characters 23a, 23b, 23c, 23d and 23e, reference characters 33a, 33b, 33c, 33d and to 33e, and reference characters 43a to 43c correspond to reference characters 3a to 3e in FIG. 2.

Second Embodiment

Figure 6A:
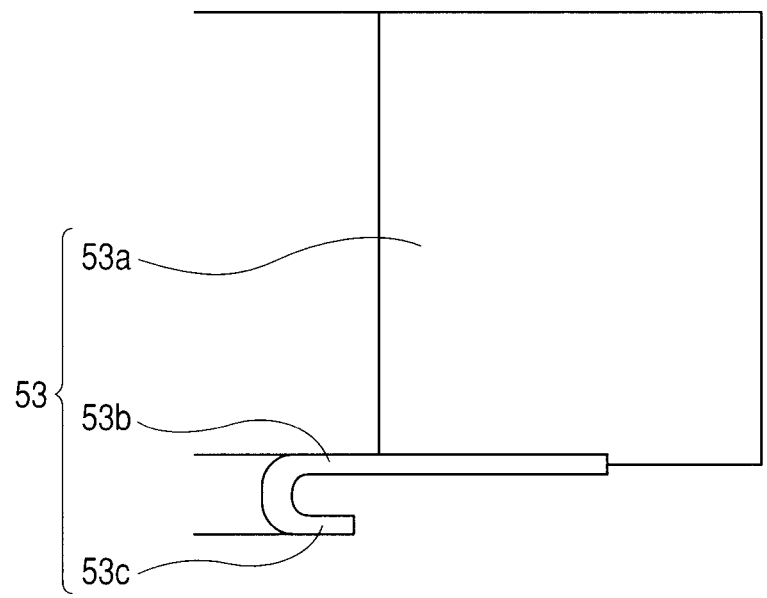
FIG. 6A is a partially enlarged sectional view of a moving member of a vibration driven apparatus according to a second embodiment of the present invention.

A second embodiment according to the present invention is different from the above described first embodiment in that the supporting portion, the contacting portion, and the main body portion are configured as illustrated in FIG. 6A.

The other elements (piezoelectric element 1 and vibration member 2) of the present embodiment are the same as those corresponding to the above described first embodiment, and hence the description thereof is omitted.

Note that the configuration illustrated in FIG. 6A according to the present embodiment corresponds to FIG. 2, and FIG. 5A, FIG. 5B, FIG. 5C and FIG. 5D.

In FIG. 6A, a supporting portion 53b and a contacting portion 53c are integrally formed by sheet metal press working.

The supporting portion 53b and the contacting portion 53c are made of a stainless steel plate, and are subjected to quenching and tempering treatment to improve the durability.

A main body portion 53a is formed in an annular shape, and the main body portion 53a and the supporting portion 53b are joined to each other by, such as bonding by an adhesive, metal brazing, such as soldering, and welding by laser, electric resistance heat, or the like.

The supporting portion 53b and the contacting portion 53c are formed in a thickness to have a spring property, so that each of the supporting portion 53b and the contacting portion 53c is made elastically deformable in the rotation axis direction of a moving member 53. Further, the supporting portion 53b and the contacting portion 53c are also made elastically deformable in the radial direction of the moving member 53. The supporting portion 53b and the contacting portion 53c are formed so that the displacement of the contacting portion 53c, which is generated at the time when the contacting portion 53c is brought into contact with the vibration member 2, is larger on the outer diameter side than on the inner diameter side.

Thereby, the contact surface of the vibration member 2 and the friction surface of the contacting portion 53c can be repeatedly brought into contact with each other, while the inclination of the contact surface of the vibration member 2 and the inclination of the friction surface of the contacting portion 53c are maintained in parallel with each other. As a result, the whole friction surface of the contacting portion 53c can be brought into contact with the vibration member 2.

Thereby, the contact surface pressure on the friction surface of the contacting portion 53c can be made uniform, so that the local wear can be reduced.

Further, the direction of displacement of the friction surface of the contacting portion 53c substantially coincides with the direction of vibration trajectory of the vibration member 2 over the whole region of the friction surface.

Thereby, when the contacting portion 53c is enlarged to increase the contact area, it is possible to improve the durability of the vibration driven apparatus while avoiding the deteriorations of performance, such as the reduction in efficiency and the generation of squealing sounds.

Further, the supporting portion 53b and the contacting portion 53c can be integrally formed by press working, and the main body portion 53a can also be formed by press working, sintering, die-casting, or the like. Thus, it is possible to significantly reduce the cost and manufacturing time as compared with the case where the portions are formed by the conventional cutting work.

Further, since the precision of sheet thickness of the raw material used for the sheet metal press working is very high, variation in the elasticity of the supporting portion 53b and the contacting portion 53c can be reduced, so as to enable a stable contact between the contacting portion 53c and the vibration member 2.

Figure 6B:
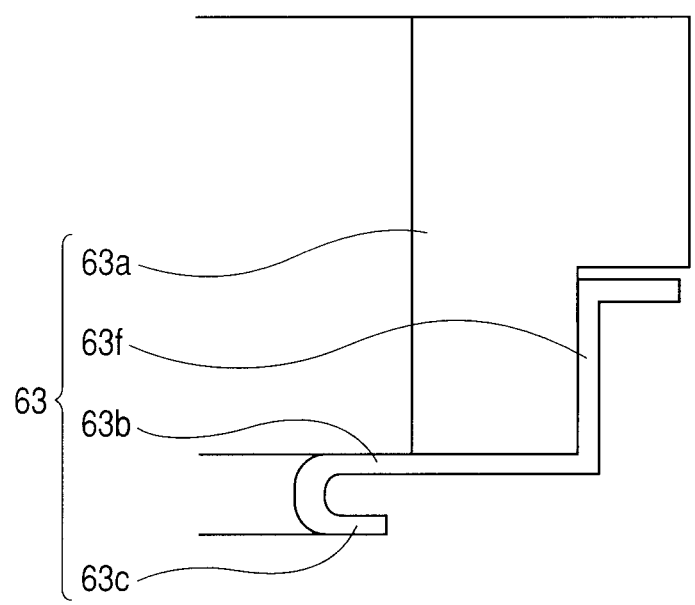
FIG. 6B is a partially enlarged sectional view of a moving member according to a first modification of the vibration driven apparatus according to the second embodiment.

The configuration of a first modification of the present embodiment illustrated in FIG. 6B corresponds to FIG. 2, FIG. 5A, FIG. 5B, FIG. 5C, FIG. 5D, and FIG. 6A.

As illustrated in FIG. 6B, an attaching portion 63f is vertically extended from the outer diameter side end portion of a supporting portion 63b, and the supporting portion 63b and the attaching portion 63f are joined to a main body portion 63a, respectively. When the attaching portion 63f is formed to extend from the end portion of the supporting portion 63b, the deformation of the supporting portion 63b, a contacting portion 63c, and the attaching portion 63f, which are integrally formed, can be suppressed at the time when the portions are subjected to quenching and tempering treatment.

Thereby, it is possible to reduce the time of the polishing work for finishing the friction surface of the contacting portion 63c with a high flatness precision.

Note that in the present embodiment, the quenching and tempering treatment is performed as a surface treatment for improving the wear resistance, but the present invention is not limited to this. The friction surface of the contacting portion may be hardened by nitriding treatment, metal spraying, or the like.

Third Embodiment

Figure 7A:
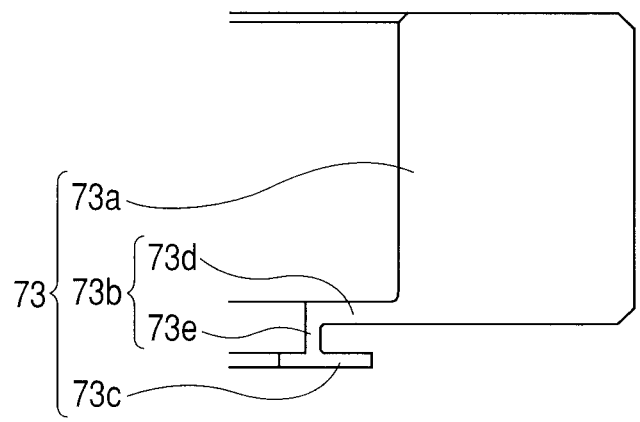
FIG. 7A is a partially enlarged sectional view of a moving member of a vibration driven apparatus according to a third embodiment of the present invention.

A third embodiment according to the present invention is different from the above described first embodiment in that the supporting portion, the contacting portion, and the main body portion are configured as illustrated in FIG. 7A.

The other elements (piezoelectric element 1 and vibration member 2) of the present embodiment are the same as those corresponding to the above described first embodiment, and hence the description thereof is omitted.

Note that the configuration of the present embodiment illustrated in FIG. 7A corresponds to FIG. 2, FIG. 5A, FIG. 5B, FIG. 5C, FIG. 5D, FIG. 6A, and FIG. 6B.

In FIG. 7A, a contacting portion 73c is extended to the outer diameter section side from a second supporting portion 73e, and the inner diameter side end portion of the contacting portion 73c is made to project to the inner diameter side from the second supporting portion 73e.

The projecting length of the contacting portion 73c to the inner diameter side is sufficiently smaller than the extending length of the contacting portion 73c from the second supporting portion 73e to the outer diameter side.

Therefore, the whole friction surface of the contacting portion 73c can be brought into contact with the vibration member 2 similarly to the first and second embodiments.

Further, the direction of displacement of the friction surface of the contacting portion 73c substantially coincides with the direction of vibration trajectory of the vibration member 2 over the whole region of the friction surface.

Next, the effect of the present embodiment, in which the second supporting portion 73e is formed on the outer diameter side from the end portion of the contacting portion 73c, will be described.

When the contacting portion 73c is enlarged in order to improve the durability of the vibration driven apparatus, the direction of displacement of the friction surface of the contacting portion 73c is adjusted in connection with the enlargement, and hence the radial direction width of the second supporting portion 73e also needs to be increased.

However, when the width of the second supporting portion 73e is increased, the weight thereof also is increased, so that the natural frequency of a supporting portion 73b and the contacting portion 73c may be lowered, so as to cause deterioration of the follow-up performance with respect to the vibration of the vibration member 2.

For this reason, in the present embodiment, the inner diameter side thickness of the second supporting portion 73e is reduced, while the outer diameter side position of the connecting portion between the second supporting portion 73e and the contacting portion 73c is maintained.

Thereby, the weight of the supporting portion can be reduced to raise the natural frequency, so that the follow-up performance with respect to the vibration of the vibration member can be improved.

Fourth Embodiment

Figure 7B:
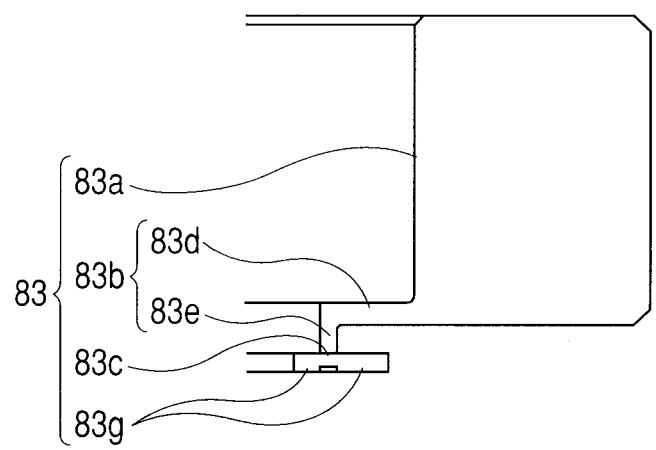
FIG. 7B is a partially enlarged sectional view of a moving member of a vibration driven apparatus according to a fourth embodiment of the present invention.

A fourth embodiment according to the present invention is different from the above described first embodiment in that the supporting portion, the contacting portion, and the main body portion are configured as illustrated in FIG. 7B.

Other elements (piezoelectric element 1 and vibration member 2) of the present embodiment are the same as those corresponding to the above described first embodiment, and hence the description thereof is omitted.

Note that the configuration of the present embodiment illustrated in FIG. 7B corresponds to FIG. 2, FIG. 5A, FIG. 5B, FIG. 5C, FIG. 5D, FIG. 6A, FIG. 6B, and FIG. 7A.

In FIG. 7B, a supporting portion 83b and a contacting portion 83c are respectively formed as separate members. The supporting portion 83b and the contacting portion 83c are joined to each other by, such as bonding by an adhesive, metal brazing, such as soldering, and welding by laser, electric resistance heat, or the like.

This facilitates the working as compared with the case where the supporting portion 83b and the contacting portion 83c are integrally formed.

Further, it is possible to manufacture the contacting portion 83c by a material which enables high frictional force and high wear resistance to be obtained, such as alumina, and silicon carbide, that has been conventionally difficult to be used because of its workability inferior to metal.

Further, the contacting portion 83c can also be made of a resin produced by calcination in which fluororesin powder (PTFE: polytetrafluoroethylene) is used as a main material, and in which a carbon fiber, polyimide, and molybdenum disulfide are used as additives.

Thereby, it is possible to increase the torque generated by the vibration wave motor and to improve the durability of the vibration wave motor.

Further, two protrusions 83g are formed on the friction surface of the contacting portion 83c, so as to be brought into contact with the vibration member 2. Therefore, even when the joining portion of the contacting portion 83c is deformed at the time when the supporting portion 83b is joined to the contacting portion 83c, since only the protrusions 83g are brought into contact with the vibration member 2, it is possible to reduce the influence of the deformation and to maintain the stable contact.

Further, while it is necessary to finish the friction surface of the contacting portion 83c with a high flatness precision in order to bring the friction surface into good contact with the vibration member 2, according to the present embodiment, since only the protrusions 83g on the friction surface of the contacting portion 83c need to be polished, it is possible to shorten the working time.

Note that in the present embodiment, the contacting portion 83c is made to project to the inner diameter side from the supporting portion 83b, but the present invention is not limited to this.

Figure 7C:
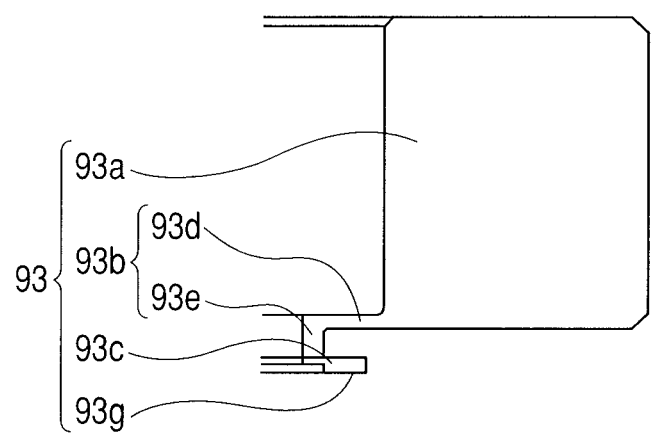
FIG. 7C is a partially enlarged sectional view of a moving member according to a first modification of the fourth embodiment.

For example, as illustrated in FIG. 7C, the end portion of a contacting portion 93c and a supporting portion 93b may be joined to each other, so as to form one protrusion 93g.

Further, in the present embodiment, the protrusions 83g are formed integrally with the friction surface of the contacting portion 83c, but the present invention is not limited to this. The protrusions 83g may also be formed as members separate from the contacting portion 83c, so as to be joined to the contacting portion 83c.

Fifth Embodiment

A fifth embodiment according to the present invention is different from the above described first embodiment in the configuration in which a plurality of movable bodies are provided, and in which the respective contacting portions of the movable bodies are coaxially provided.

The other elements (piezoelectric element 1 and vibration member 2) of the present embodiment are the same as those corresponding to the above described first embodiment, and hence the description thereof is omitted.

Figure 8A:
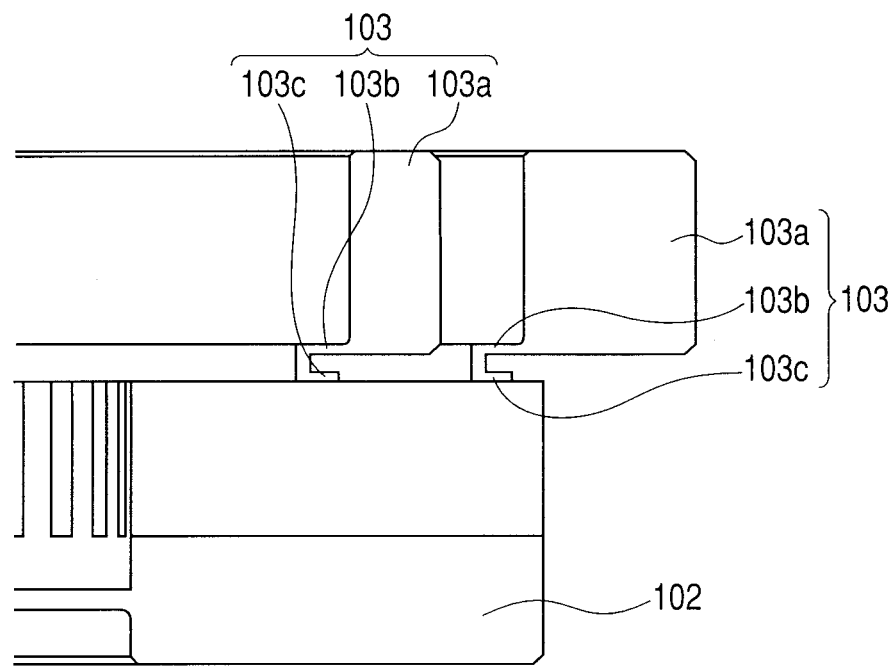
FIG. 8A is a partially enlarged sectional view of a moving member of a vibration driven apparatus according to a fifth embodiment of the present invention.

In FIG. 8A illustrating a configuration according to the present embodiment, two movable bodies 103 are provided for an vibration member 102. A supporting portion 103b and a contacting portion 103c of each of the movable bodies 103 are formed in such a manner that the whole friction surface of the contacting portion 103c is brought into contact with the vibration member 102, and that the direction of vibration trajectory of the vibration member 102 substantially coincides with the direction of displacement of the whole region of the friction surface.

When the two movable bodies 103 are provided in this way, the frictional force can be increased without increasing the surface pressure on the friction surface of the contacting portion 103c, while, in each of the movable bodies 103 the follow-up performance with respect to the vibration of the vibration member 2 is maintained.

Thereby, it is possible to improve the generation of torque in the vibration driven apparatus.

Further, when the torque is maintained, the surface pressure can be reduced, so as to improve the durability.

Note that in the present embodiment, one supporting portion 103b and one contacting portion 103c are provided for one main body portion 103a, but the shape of the supporting portion and the contacting portion, which are used in the present embodiment, is not limited to this.

Figure 8B:
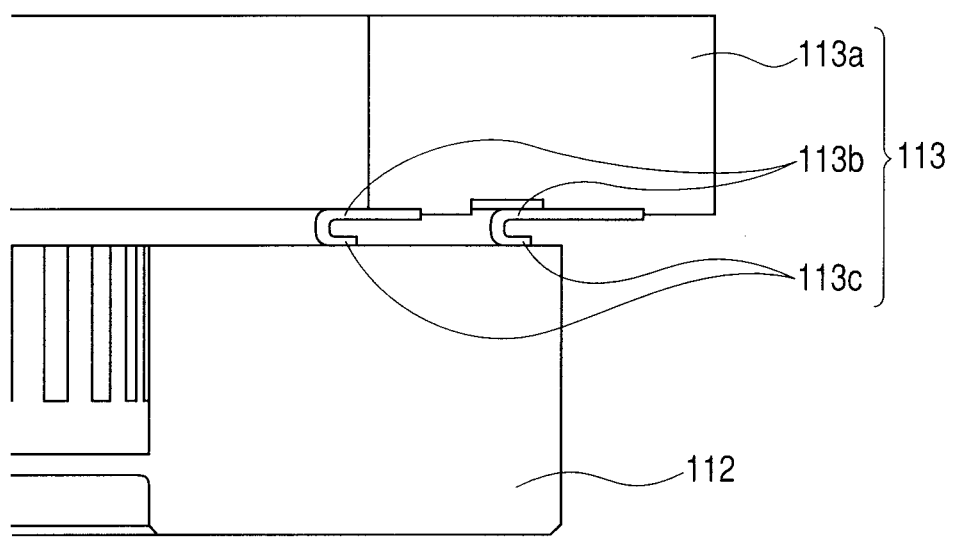
FIG. 8B is a partially enlarged sectional view of a moving member according to a first modification of the fifth embodiment.
Figure 9A:
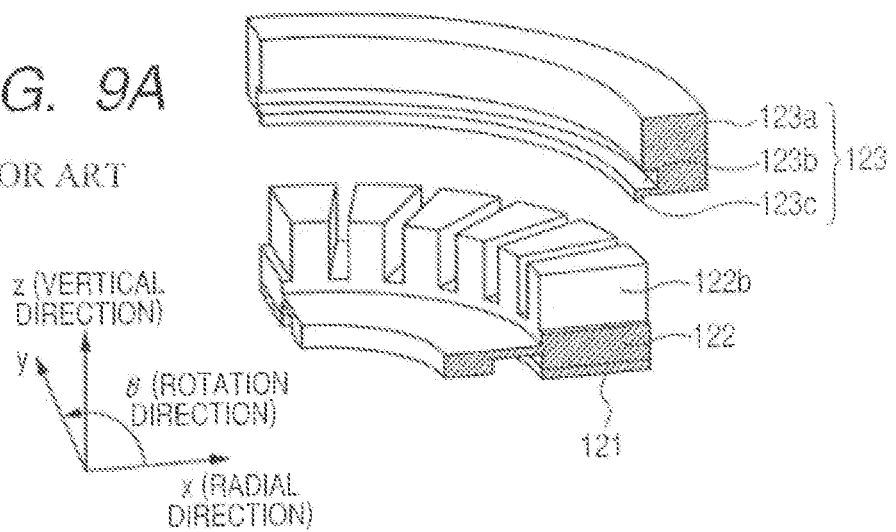
FIG. 9A is a perspective view of a vibration driven apparatus of a prior art form.
Figure 9B:
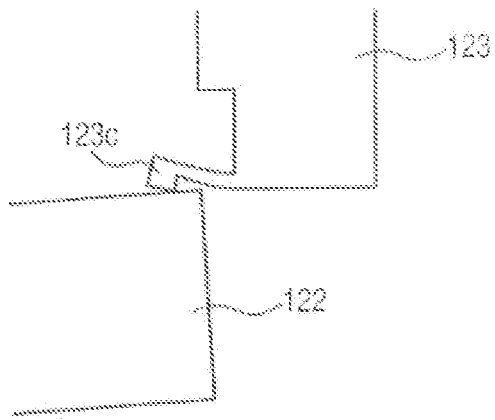
FIG. 9B is a view illustrating a state in which the vibration member and the moving member of the vibration driven apparatus of the prior art form are brought into contact with each other.
Figure 9C:
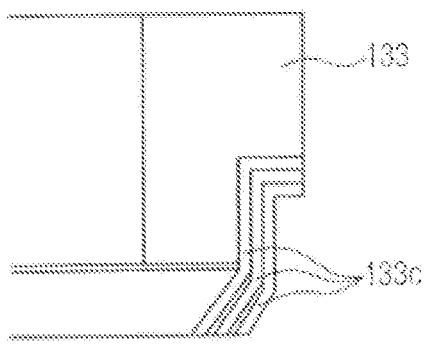
FIG. 9C is a partially enlarged sectional view of a moving member of a vibration driven apparatus of another prior art.

For example, as illustrated in FIG. 8B, a plurality of sets of a supporting portion 113b and a contacting portion 113c may also be provided for one main body 113a.

As described above, according to the configurations of the above described embodiments of the present invention, each of the supporting portion and the contacting portion of the moving member is elastically deformed, so that the whole friction surface of the contacting portion of the moving member can be brought into contact with the vibration member.

Thereby, the local wear of the contacting member can be reduced, and the performance deterioration due to long term operation can be reduced.

Further, the direction of displacement in the whole region of the friction surface of the moving member substantially coincides with the direction of vibration of the vibration member, and hence the sliding in the radial direction on the friction surface can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-092671, filed on Apr. 7, 2009, and 2010-023124, filed on Feb. 4, 2010, which are hereby incorporated by reference herein in their entirety.

The invention claimed is:

1. A rotary type vibration wave driving apparatus comprising:
   an electro-mechanical energy conversion element;
   a vibration member which is fixed to the electro-mechanical energy conversion element; and
   a driven member which is configured to be brought into contact with the vibration member and adapted to be driven to rotate about a rotation axis by the vibration member,
   wherein the driven member comprises:
      a main body portion;
      a first supporting portion extending directly from the main body portion in a radial direction toward a rotation axis of the driven member;
      a second supporting portion extending directly from the first supporting portion in a rotation axis direction toward the vibration member; and
      a contacting portion extending directly from the second supporting portion in a direction parallel to and opposite to the radial direction, away from the rotation axis of the driven member, a surface of the contacting portion being in contact with a surface of the vibration member,
   wherein a dimension of the second supporting portion in the radial direction is smaller than a dimension of the contacting portion in the radial direction,
   wherein the vibration member and the driven member are configured such that, when the driven member is driven by the vibration member, a positional relationship between the vibration member and the contacting portion of the driven member changes, and
   wherein each of the first supporting portion and the contacting portion is configured to have an elastically deformable structure adapted to be displaced in the rotation axis direction and the radial direction such that, when the surface of the contacting portion is in press-contact with the surface of the vibration member by the vibration of the vibration member, (1) the surface of the contacting portion and the surface of the vibration member are in parallel, and (2) a direction of displacement of the surface of the contacting portion coincides with a direction of a vibration trajectory of the vibration member.

2. A rotary type vibration wave driving apparatus comprising:
   an electro-mechanical energy conversion element;
   a vibration member which is fixed to the electro-mechanical energy conversion element; and
   a driven member which is configured to be brought into contact with the vibration member and adapted to be driven to rotate about a rotation axis by the vibration member, the driven member comprising:
      a main body portion;
      a supporting portion comprising:
         a first supporting portion extending directly from the main body portion in a radial direction toward a rotation axis of the driven member;
         a second supporting portion extending directly from the first supporting portion in a rotational axis direction toward the vibration member; and
         a contacting portion extending directly from the second supporting portion in a direction parallel to and opposite to the radial direction, away from the rotation axis of the driven member, a surface of the contacting portion being in contact with a surface of the vibration member,
   wherein the first supporting portion, the second supporting portion, and the contacting portion are configured such that, the first supporting portion has a cantilever sectional structure with respect to the main body portion and the contacting portion has a cantilever sectional structure with respect to the second supporting portion, and, when the surface of the contacting portion is in press-contact with the surface of the vibration member by the vibration of the vibration member, to maintain the surface of the contacting portion and the surface of the vibration member are in parallel, and
   wherein the vibration member and the driven member are configured such that, when the driven member is driven by the vibration member, a positional relationship between the surface of the vibration member and the surface of the contacting portion of the driven member changes.

3. The rotary type vibration wave driving apparatus according to claim 2, wherein the first supporting portion is formed to have a uniform thickness in the circumferential direction, and
   wherein the contacting portion is formed to have a uniform thickness in the circumferential direction.

4. The rotary type vibration wave driving apparatus according to claim 1, wherein a displacement of the contacting portion is larger at an outer side than at an inner side.

5. The rotary type vibration wave driving apparatus according to claim 1, wherein the second supporting portion extends from an end portion of the first supporting portion.

6. The rotary type vibration wave driving apparatus according to claim 1, wherein the first supporting portion, the second supporting portion, and the contacting portion are formed by press working.

7. The rotary type vibration wave driving apparatus according to claim 1, wherein an inner side end portion of the contacting portion is made to project to an inner side from the second supporting portion.

8. The rotary type vibration wave driving apparatus according to claim 1, wherein the contacting portion is formed by a member separated from the second supporting portion.

9. The rotary type vibration wave driving apparatus according to claim 2, wherein the vibration member vibrates when a voltage is supplied to the electro-mechanical energy conversion element.

10. The rotary type vibration wave driving apparatus according to claim 2, wherein the radial direction is a direction from an outer side of the driven member to an inner side of the driven member.

11. The rotary type vibration wave driving apparatus according to claim 1, wherein the first supporting portion is formed to have a uniform thickness in the circumferential direction, and wherein the contacting portion is formed to have a uniform thickness in the circumferential direction.

12. The rotary type vibration wave driving apparatus according to claim 1, wherein the vibration member vibrates when a voltage is supplied to the electro-mechanical energy conversion element.

13. The rotary type vibration wave driving apparatus according to claim 1, wherein the driven member is configured to be frictionally driven by the vibration of the vibration member.

14. The rotary type vibration wave driving apparatus according to claim 2, wherein the driven member is configured to be frictionally driven by the vibration of the vibration member.

15. The rotary type vibration wave driving apparatus according to claim 1, wherein at least one of the first supporting portion and second supporting portion has a thickness adapted to have a spring property.

16. The rotary type vibration wave driving apparatus according to claim 1, wherein the contacting portion has a thickness adapted to have a spring property.

17. The rotary type vibration wave driving apparatus according to claim 1, wherein the radial direction is a direction from an outer side of the driven member to an inner side of the driven member.

18. The rotary type vibration wave driving apparatus according to claim 1, wherein the first supporting portion has a surface opposing a surface of the contacting portion with a space interposed therebetween.

19. The rotary type vibration wave driving apparatus according to claim 2, wherein the first supporting portion has a surface opposing a surface of the contacting portion with a space interposed therebetween.

20. The rotary type vibration wave driving apparatus according to claim 2, wherein a dimension of the second supporting portion in the radial direction is smaller than a dimension of the contacting portion in the radial direction.

21. The rotary type vibration wave driving apparatus according to claim 2, wherein a direction of displacement of the surface of the contacting portion coincides with a direction of a vibration trajectory of the vibration member.

22. The rotary type vibration wave driving apparatus according to claim 1, wherein, in the rotation axis direction, a dimension of the contacting portion is smaller than a dimension of the vibration member, the contacting portion being substantially in contact with the vibration member from one end to the other end in the rotation axis direction.

* * * * *